United States Patent
Ohtsu et al.

(10) Patent No.: US 8,606,243 B2
(45) Date of Patent: *Dec. 10, 2013

(54) MOBILE NETWORK SYSTEM AND GUIDANCE MESSAGE PROVIDING METHOD

(75) Inventors: Kazuyuki Ohtsu, Kawasaki (JP); Yuji Tajima, Kawasaki (JP); Takashi Mitsuhashi, Kawasaki (JP); Kohji Inokawa, Kawasaki (JP); Yumi Eguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

This patent is subject to a terminal disclaimer.

(21) Appl. No.: 12/638,130

(22) Filed: Dec. 15, 2009

(65) Prior Publication Data
US 2010/0149974 A1 Jun. 17, 2010

(30) Foreign Application Priority Data
Dec. 16, 2008 (JP) ................................ 2008-319528

(51) Int. Cl.
| | |
|---|---|
| H04M 3/42 | (2006.01) |
| H04W 40/00 | (2009.01) |
| H04W 4/00 | (2009.01) |
| G01R 31/08 | (2006.01) |
| H04L 1/00 | (2006.01) |
| H04J 3/26 | (2006.01) |
| G06F 15/177 | (2006.01) |
| G06F 15/16 | (2006.01) |

(52) U.S. Cl.
USPC ........ 455/414.1; 455/445; 455/453; 455/466; 370/229; 370/230; 370/432; 709/220; 709/222; 709/229

(58) Field of Classification Search
USPC .................. 455/414.1, 422.1, 445, 453, 466; 370/229, 230, 395.2, 432; 709/220, 709/222–229
See application file for complete search history.

(56) References Cited

U.S. PATENT DOCUMENTS

| | | | |
|---|---|---|---|
| 5,666,356 A * | 9/1997 | Fleming et al. ................ | 370/328 |
| 6,331,983 B1 * | 12/2001 | Haggerty et al. ............. | 370/400 |

(Continued)

FOREIGN PATENT DOCUMENTS

| | | |
|---|---|---|
| JP | 10-336176 | 12/1998 |
| JP | 2002-124949 | 4/2002 |

(Continued)

OTHER PUBLICATIONS

U.S. Appl. No. 12/638,245, filed Dec. 15, 2009, Kazuyuki Ohtsu, Fujitsu Limited.

(Continued)

*Primary Examiner* — Wesley Kim
(74) *Attorney, Agent, or Firm* — Staas & Halsey LLP

(57) ABSTRACT

A mobile network system includes a guidance message control server, a call control server and a plurality of access gateways. The call control server includes a gateway management section that determines an access gateway as a subject of call restriction, a first instructing section that transmits a message transmission instruction to the guidance message control server and a second instructing section that transmits a call restriction instruction to the access gateway. The guidance message control server includes a receiving section that receives the message transmission instruction, an acquisition section that acquires a guidance message data and a transmission section that transmits the guidance message data to a specified multicast group. Each of the access gateways includes a processing section that performs multicast group participation processing for participating in the specified multicast group and a guidance transmission section that transmits the guidance message data to a mobile terminal.

9 Claims, 13 Drawing Sheets

(56) References Cited

U.S. PATENT DOCUMENTS

| | | |
|---|---|---|
| 7,173,904 B1 * | 2/2007 | Kim .............................. 370/230 |
| 7,764,680 B2 * | 7/2010 | Matsumoto et al. .......... 370/389 |
| 8,135,120 B2 * | 3/2012 | Yasuda ......................... 379/196 |
| 2004/0048617 A1 | 3/2004 | MacArthur et al. |
| 2005/0027830 A1 | 2/2005 | Florkey et al. |
| 2006/0023733 A1 * | 2/2006 | Shimizu et al. ............... 370/432 |
| 2006/0160549 A1 * | 7/2006 | Sato et al. ..................... 455/503 |
| 2007/0160056 A1 | 7/2007 | Matsumoto et al. |
| 2007/0171823 A1 | 7/2007 | Hunt et al. |
| 2008/0239964 A1 | 10/2008 | Mitsutake |

FOREIGN PATENT DOCUMENTS

| | | |
|---|---|---|
| JP | 2006-121517 | 5/2006 |
| JP | 2008-244685 | 10/2008 |

OTHER PUBLICATIONS

Japanese Office Action mailed Jan. 29, 2013 in corresponding Japanese Patent Application No. 2008-319528.

Extended European Search Report EESR—May 6, 2010.

* cited by examiner

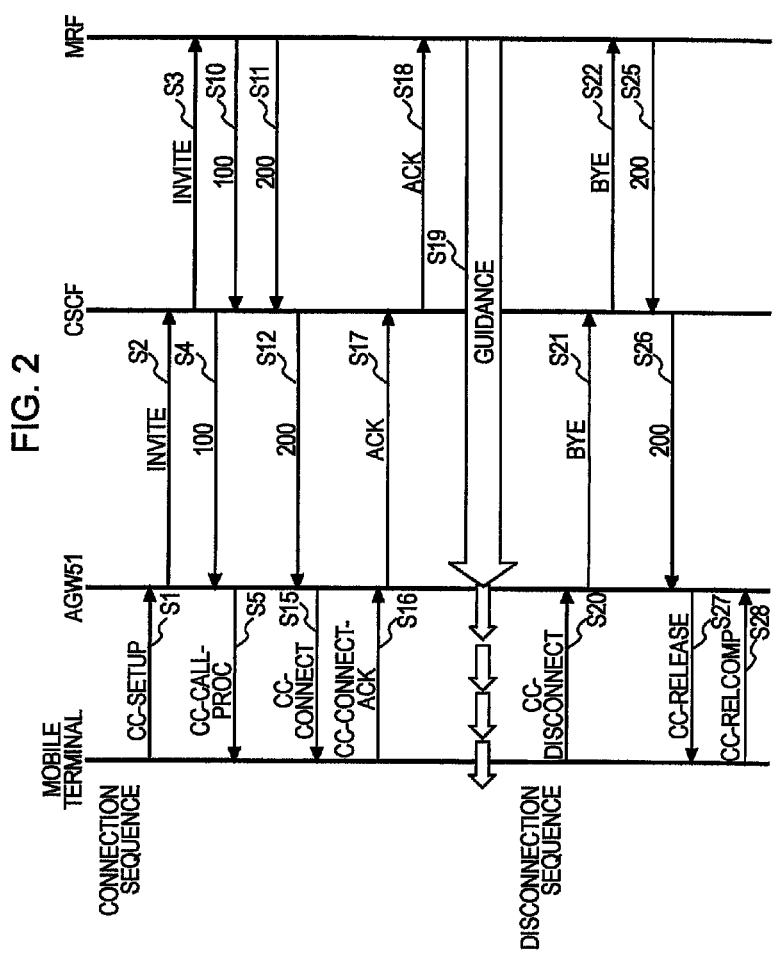

FIG. 3

```
INVITE sip:User2@recv.example.com SIP/2.0
Via: SIP/2.0/UDP cscf.example.com:5060
Max-Forwards: 70
From: User1 <sip:User1@send.example.com>; tag=98765
To: User2 <sip:User2@recv.example.com>
Call-ID: 123456@send.example.com
CSeq: 1 INVITE
Contact: <sip:User1@send.example.com>
Content-Type: application/sdp
Content-Length: 149 v=0
o=User1 1158455190 1158455190 IN IP4 send.example.com
s=Session
c=IN IP4 192.168.100.100
t=0 0
m=audio 10000 RTP/AVP 0
a=rtpmap:0 PCMU/8000
```

FIG. 4

| | 401 |
|---|---|
| | INVITE sip:LGN@recv.example.com SIP/2.0 |
| 402 | Via: SIP/2.0/UDP cscf.example.com:5060<br>Max-Forwards: 70<br>From: User1 <sip:User1@send.example.com>; tag=98765<br>To: LGN <sip:LGN@recv.example.com><br>Call-ID: 123456@send.example.com<br>CSeq: 1 INVITE<br>Contact: <sip:User1@send.example.com><br>Content-Type: application/sdp<br>Content-Length: 149 |
| 403 | |
| 404 | v=0<br>o=User1 1158455190 1158455190 IN IP4 send.example.com<br>s=Session<br>c=IN IP4 192.168.100.100<br>t=0 0<br>m=audio 10000 RTP/AVP 0<br>a=rtpmap:0 PCMU/8000 |

FIG. 7

```
INVITE sip:LGN@recv.example.com SIP/2.0                              ⎫ 71
Via: SIP/2.0/UDP cscf.example.com:5060                               ⎪
Max-Forwards: 70                                                     ⎬
From: User1 <sip:User1@send.example.com>; tag=98765                  ⎪
To: LGN <sip:LGN@recv.example.com>                                   ⎭
Call-ID: 123456@send.example.com                                     ⎫ 72
CSeq: 1 INVITE                                                       ⎬
Contact: <sip:User1@send.example.com>                                ⎭
Content-Type: application/sdp                                        ⎫ 73
Content-Length: 149                                                  ⎭ v=0                                                                  ⎫
o=User1 1158455190 1158455190 IN IP4 send.example.com                ⎪
s=Session                                                            ⎪
c=IN IP4 239.1.1.1/255      ← MULTICAST GROUP INFORMATION            ⎬ 74
t=0 0                                                                ⎪
m=audio 50000 RTP/AVP 0     ← PORT NUMBER                            ⎪
a=rtpmap:0 PCMU/8000                                                 ⎭
```

FIG. 8

| | |
|---|---|
| OPTIONS sip:agw#n@recv.example.com SIP/2.0 | 81 |
| Via: SIP/2.0/UDP agw#n@recv.example.com;branch=z9hG4bKhjhs8ass877<br>Max-Forwards: 70<br>From: CSCF <sip:cscf@example.com>; tag=98765<br>To: AGW#n <sip:agw#n@recv.example.com><br>Call-ID: a84b4c76e66710<br>CSeq: 63104 OPTIONS<br>Contact: <sip:cscf@example.com><br>Accept: application/sdp<br>Overload-Control: 100;target=sip:agw#n@recv.example.com;text="call restriction"<br>Content-Length: 149 | 82 |
| | 83 |
| v=0<br>o=cscf 1158455190 1158455190 IN IP4 example.com<br>s=Announcing<br>c=IN IP4 239.1.1.1/255   (MULTICAST GROUP INFORMATION)<br>t=0 0<br>m=audio 50000 RTP/AVP 0   (PORT NUMBER)<br>a=rtpmap:0 PCMU/8000<br>a=sndonly | 84 |

FIG. 9

```
OPTIONS sip:agw#n@recv.example.com SIP/2.0                         ~91

Via: SIP/2.0/UDP agw#n@recv.example.com;branch=z9hG4bKhjhs8ass877
Max-Forwards: 70
From: CSCF <sip:cscf@example.com>; tag=98765
To: AGW#n <sip:agw#n@recv.example.com>                             ~92
Call-ID: a84b4c76e66710
CSeq: 63105 OPTIONS
Contact: <sip:cscf@example.com>
Accept: application/sdp
Overload-Control: 0;target=sip:agw#n@recv.example.com;text="call restriction"
Content-Length: 149
                                                                   ~93
v=0
o=cscf 1158455190 1158455190 IN IP4 example.com
s=Announcing
c=IN IP4 239.1.1.1/255   (MULTICAST GROUP INFORMATION)             ~94
t=0 0
m=audio 50000 RTP/AVP 0
a=rtpmap:0 PCMU/8000     (PORT NUMBER)
a=sndonly
```

MOBILE NETWORK SYSTEM AND GUIDANCE MESSAGE PROVIDING METHOD

CROSS-REFERENCE TO RELATED APPLICATIONS

This application is related to and claims priority to Japanese Patent Application No. 2008-319528 filed on Dec. 16, 2008, and incorporated herein by reference.

BACKGROUND

1. Field

The embodiments discussed herein are related to providing a guidance message at a time of call restriction in a mobile network.

2. Description of the Related Art

At a place of an event such as a concert or a sporting event, since a plurality of persons send captured images using mobile telephones (mobile terminals), calls with high traffic tend to frequently occur. A similar tendency is observed at the source of a disaster such as an earthquake or a fire. If communications are centralized in such a narrow communication area, it may be difficult to connect a call sent from a mobile terminal placed in the communication area and connect a call to the mobile terminal. One of the reasons for this difficulty may be a lack of communication resources that are required for each call.

Conventionally, upon a lack of communication resources, a communication carrier provides a guidance message saying that "the line is very busy, please try your call later" for a mobile terminal that is the source of a call and restricts the call. Japanese Unexamined Patent Application Publication No. 2002-124949 discloses the related art.

SUMMARY

It is an aspect of the embodiments discussed herein to provide a mobile network system.

The above aspects can be attained by a system that includes a guidance message control server, a call control server and a plurality of access gateways each of which is connected to a mobile terminal via a wireless base station.

The call control server includes a gateway management section that determines at least one of the plurality of access gateways as a subject of call restriction, a first instructing section that transmits a message transmission instruction including message specifying information and group specifying information to the guidance message control server in a case where the gateway management section determines an access gateway to be call-restricted and a second instructing section that transmits a call restriction instruction including the group specifying information to the access gateway to be call-restricted determined by the gateway management section.

The guidance message control server includes a receiving section that receives the message transmission instruction from the call control server, an acquisition section that acquires guidance message data specified by the message specifying information included in the message transmission instruction received by the receiving section and a transmission section that transmits using a multicast transmission the guidance message data acquired by the acquisition section to a multicast group specified by the group specifying information included in the message transmission instruction received by the receiving section.

Each of the plurality of access gateways includes a processing section that, in a case where the processing section receives the call restriction instruction from the call control server, performs multicast group participation processing for participating in the multicast group specified by the group specifying information included in the call restriction instruction, and a guidance transmission section that transmits the guidance message data that is received as a result of the multicast group participation processing performed by the processing section to the mobile terminal requesting the guidance transmission section to perform call connection via the wireless base station.

These together with other aspects and advantages which will be subsequently apparent, reside in the details of construction and operation as more fully hereinafter described and claimed, reference being had to the accompanying drawings forming a part hereof, wherein like numerals refer to like parts throughout.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

FIG. 2 illustrates a guidance message unicast connection process;

FIG. 3 illustrates an exemplary format of an INVITE message;

FIG. 4 illustrates an exemplary format of the INVITE message at the time of unicast connection of a guidance message;

FIG. 7 illustrates an exemplary format of an INVITE message;

FIG. 8 illustrates an exemplary format of an OPTIONS message used for a call restriction instruction;

FIG. 9 illustrates an exemplary format of an OPTIONS message used for a call restriction removal instruction;

DETAILED DESCRIPTION OF THE EMBODIMENTS

Figure 1:
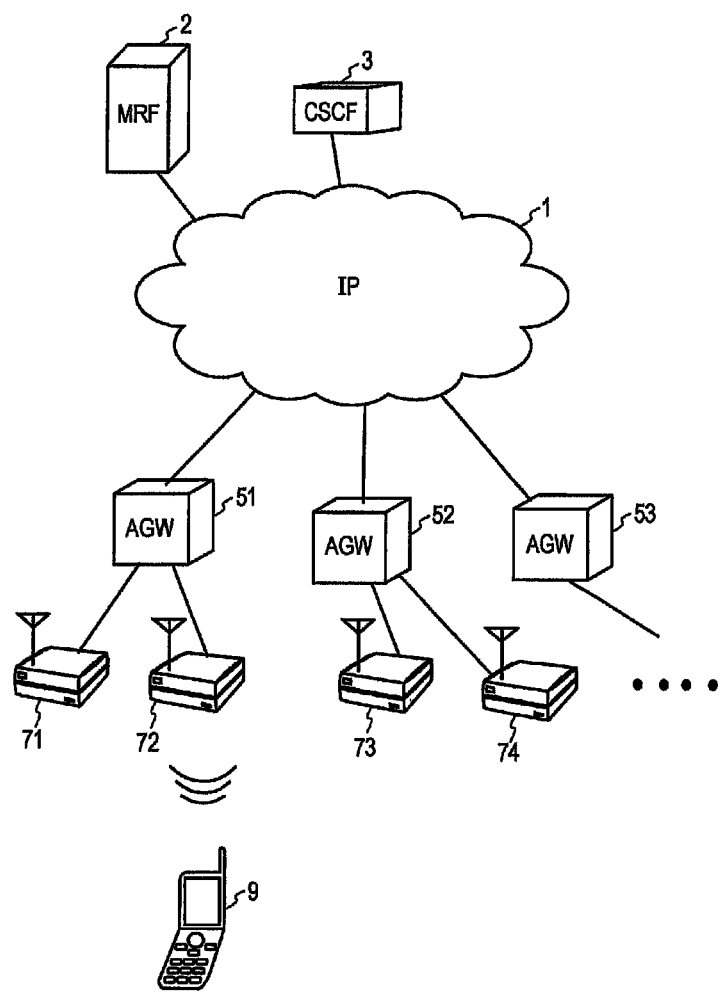
FIG. 1 illustrates a system configuration of a mobile network system.

Conventionally, a system configuration of a mobile network system, as illustrated in FIG. 1, includes an Media Resource Control Function or Multimedia Resource Function (MRF) server 2, a Call Signaling Control Function (CSCF) server 3, an Access GateWay (AGW) servers 51, 52, 53, etc., wireless base station apparatus (hereinafter also referred to as a "base station") 71, 72, 73, 74, etc. The MRF server 2, the CSCF server 3, and the AGW servers 51, 52, 53, etc. are connected to each other via an Internet Protocol (IP) network 1.

If a mobile terminal 9 accesses this mobile network system via a base station 71, 72, 73, 74, etc., it receives various communication services from the mobile network system. Guidance message providing services may be defined as services for providing various guidance messages to the mobile terminal 9 processed by a caller. In an exemplary case a guidance message is provided for a mobile terminal when the mobile terminal cannot receive a communication service due to call restriction. These guidance message providing services include a service for automatically providing an audio response message in accordance with a number dialed by a caller.

Roles of nodes included in a mobile network system is disclosed.

The MRF server 2 provides various guidance messages in response to a request transmitted from the CSCF server 3. For example, the MRF server 2 exchanges data with the CSCF server 3 using the Session Initiation Protocol (SIP) and transmits a guidance message using the Real-time Transport Protocol (RTP). SIP is a text-based protocol, and uses the Uniform Resource Identifiers (URIs) to designate addresses of a communication destination and a communication source. RTP is a protocol used on the User Datagram Protocol (UDP), and is mainly used for real-time data transmission. The guidance message may be registered in advance in the MRF server 2 as message data, and is, for example, a message saying that "the line is very busy, please try your call later".

The CSCF server 3 has an SIP server function, and performs call control for the mobile terminal 9. Furthermore, the CSCF server 3 manages the load on the AGW servers 51, 52, and 53 and performs call restriction for the AGW servers 51, 52, and 53 in accordance with the load. If the CSCF server 3 receives a call connection request from the call-restricted AGW servers 51, 52, and 53, it instructs the MRF server 2 to connect the call to a predetermined guidance message. Call control functions possessed by the CSCF server 3 are defined as three functions, the Serving Call Session Control Function (S-CSCF), the Interrogating Call Session Control Function (I-CSCF), and the Proxy Call Session Control Function (P-CSCF) in the IP Multimedia Subsystem (IMS) specified by the 3rd Generation Partnership Project (3GPP).

The AGW servers 51, 52, and 53 terminate Radio Access Network (RAN) communication that is performed with the mobile terminal 9 via the base station 71, 72, 73, 74, etc. subordinated thereto. The AGW servers 51, 52, and 53 may be connected to the base station 71, 72, 73, 74, etc. using IP or the Asynchronous Transfer Mode (ATM). In RAN, for example, the Call Control (CC) protocol specified by the International Mobile Telecommunication (IMT)-2000 is executed.

Furthermore, the AGW servers 51, 52, and 53 is connected to the IP network 1, and terminates the Voice over Internet Protocol (VoIP) executed on the IP network 1. If the AGW servers 51, 52, and 53 receives a call from the mobile terminal 9 via the base station 71, 72, 73, 74, etc. subordinated thereto using the CC protocol, it performs a predetermined procedure with the CSCF server 3 using SIR The predetermined procedure is, for example, the registration of the position of the mobile terminal 9 in the CSCF server 3. If the call is connected between the mobile terminal 9 and another mobile terminal under the control of the CSCF server 3, the AGW servers 51, 52, and 53 relays between RAN and VoIP data of communication between these mobile terminals. The base station 71, 72, 73, 74, etc. may be wirelessly connected to the mobile terminal 9. The base station 71, for example, wirelessly receives data from the mobile terminal 9 and transfers the received data to the AGW servers 51, 52, and 53 via RAN. In contrast, the base station 71, for example, receives data from the AGW servers 51, 52, and 53 via RAN and wirelessly transfers the received data to the mobile terminal 9. Communications performed in this embodiment are not limited to the communication between the AGW servers 51, 52, and 53 and the base station 71, for example, and the wireless communication between the base station 71, for example, and the mobile terminal 9, and the descriptions thereof are therefore simplified.

Conventionally, as illustrated in FIG. 2, a guidance message unicast connection process is disclosed.

If the mobile terminal 9 originates a call, the connection between the AGW server 51 and the mobile terminal 9 is established via the base station 72 that is determined in accordance with the position of the mobile terminal 9 using the Radio Resource Control Protocol (RRC), the Mobility Management Protocol (MM), etc. If the connection between the AGW server 51 and the mobile terminal 9 is established as described previously, the mobile terminal 9 transmits a SETUP message (CC-SETUP) to the AGW server 51 via the base station 72 (S1). In the CC protocol, the SETUP message indicates that the mobile terminal 9 has originated a call. Referring to FIG. 2, "CC-" is added to a CC protocol message. Upon receiving the SETUP message, the AGW server 51 transmits an SIP INVITE message to the CSCF server 3 (S2). The INVITE message is an SIP message used to start a call session.

FIG. 3 illustrates an exemplary format of an INVITE message. As illustrated in FIG. 3, an SIP message includes a request line 301, a header part 302, empty line 303, and a body part 304. In the request line, INVITE denoting the type of a request, sip:User2@recv.example.com that is the URI of a destination of the request, SIP/2.0 denoting an SIP version, etc. are set. For example, a telephone number of a destination of a call request included in the SETUP message is set as User2 included in the URI.

In the header part, the following data may be set. In the Via field, an SIP version, a protocol type, the URI (cscf.example.com) of the CSCF server 3 functioning as a relay apparatus, and the number (5060) of a used port are set. In the From field, the URI (User1@send.example.com) of a caller and the tag (98765) of the caller are set. For example, the telephone number of the caller included in the SETUP message is set as User1 included in the URI of the caller. In the To field, the URI of the destination of the call request is set. In the Call-ID field, identification information (hereinafter also referred to as a call ID) used to identify a call is set. In the Contact field, the URI of a source of data set in the body part is set. In the Content-Type field, the type of the body part is set. In the Content-Length field, the size of the body part is set. FIG. 3 illustrates the Session Description Protocol (SDP) set as the type of the body part.

In the body part, a protocol version may be set in the v field, session identification information may be set in the o field, a session name may be set in the s field, connection information may be set in the c field, session time information may be set in the t field, media information may be set in the m field, and attribute information may be set in the a field. In this example in which a call is requested, in the m field, audio may be set as a media type, 10000 may be set as the port number of a destination of the media may be set, and RTP/AVP (Audio/Video Profile) may be set as a protocol. Contents that have not been described are specified by RFC3261, RFC2327, etc. standardized by the Internet Engineering Task Force (IETF).

Upon receiving the INVITE message from the AGW server 51 (S2), the CSCF server 3 determines whether the AGW server 51 is call-restricted. The CSCF server 3 determines in advance whether call restriction should be performed upon each of the AGW servers 51, 52, and 53 by acquiring information about the load on the AGW servers 51, 52, and 53 as appropriate. In this example, since a call transmitted to the mobile terminal 9 that is wirelessly connected to the base station 71 subordinated to the AGW server 51 and a call transmitted from the mobile terminal 9 frequently occur, the CSCF server 3 sets the AGW server 51 as a subject of call restriction.

If the CSCF server 3 determines that the AGW 51 is call-restricted, it determines that the call should be connected to a guidance message and acquires identification information (hereinafter referred to as a Logical Guidance Number (LGN)) specifying the guidance message. In this example, an LGN denoting a call restriction guidance message included in a plurality of guidance messages is acquired. The CSCF server 3 resets the LGN as information about the destination of the call request which may be set in the INVITE message, and transmits the INVITE message to the MRF server 2 (S3).

FIG. 4 illustrates an exemplary format of the INVITE message at the time of unicast connection of a guidance message including a request line 401, a header part 402, an empty line 403, and a body part 404. As illustrated in FIG. 4, in the INVITE message transmitted from the CSCF server 3 to the MRF server 2, the information (User2) about the destination of the call request illustrated in FIG. 3 is changed to LGN.

The CSCF server 3 transmits the INVITE message to the MRF server 2 (S3) and transmits a TRYING (100) message back to the AGW server 51 (S4). The TRYING (100) message is a response message that notifies a source of the INVITE message that the INVITE message has been received and processing is being performed.

Upon receiving the TRYING message from the CSCF server 3 using SIP (S4), the AGW server 51 transmits a CALL-PROCEEDING message (CC-CALL-PROC) to the mobile terminal 9 using the CC protocol (S5). Upon receiving the CALL message, the mobile terminal 9 recognizes that a call destination has started to be called and processing is being performed.

Upon receiving the INVITE message from the CSCF server 3 (S3), the MRF server 2 transmits the TRYING (100) message back to the CSCF server 3 (S10). The MRF server 2 acquires a guidance message corresponding to the LGN extracted from the INVITE message. For example, the guidance message is data that is digitalized by an audio CODEC and is then stored in the MRF server 2 in advance. If the MRF server 2 acquires the guidance message data, it transmits an OK (200) message to the CSCF server 3 (S11). In usual call connection, a mobile terminal transmits this OK message to a server so as to notify the server that it has received a call. However, in the case of the guidance message, since a receiver is not present, the OK message is transmitted immediately after the TRYING message has been transmitted. Upon receiving the OK message (S11), the CSCF server 3 transfers the OK message to the AGW server 51 (S12).

Upon receiving the OK message from the CSCF server 3 (S12), the AGW server 51 transmits a CONNECT message (CC-CONNECT) to the mobile terminal 9 using the CC protocol (S15). The AGW server 51 receives a CONNECT-ACK message (CC-CONNECT ACKNOWLEDGE) that is transmitted from the mobile terminal 9 in response to the CONNECT message (S16). As a result, the wireless access connection between the AGW server 51 and the mobile terminal 9 is established. Upon receiving the CONNECT-ACK message (S16), the AGW server 51 transmits an ACK message to the CSCF server 3 using SIP (S17). The CSCF server 3 transfers the ACK message to the MRF server 2 (S18). Instead of the CONNECT message (CC-CONNECT) and the CONNECT-ACK message (CC-CONNECT ACKNOWLEDGE), a PROGRESS message (CC-PROGRESS) and a PROGRESS-ACK message (CC-PROGRESS ACKNOWLEDGE) may be used. It may be determined which of a CONNECT message and a PROGRESS message should be used in accordance with the type (pay/free) of a provided guidance message.

Upon receiving the ACK message (S18) from the CSCF server 3 after transmitting the OK message to the CSCF server 3 (S11), the MRF server 2 transmits a guidance message to the AGW server 51 connected to the mobile terminal 9 that is the source (caller) of the call request using RTP (S19). At that time, as the IP address of the destination of the guidance message packet, the IP address (unicast address) of the AGW server 51 may be set. Upon receiving the guidance message, the AGW server 51 transmits the guidance message to the mobile terminal 9 possessed by the caller via the base station 72 (#2). As a result, the caller using the mobile terminal 9 listens to the guidance message saying that "the line is very busy, please try your call later".

A disconnection of the call performed by the mobile terminal 9 that has received the guidance message is disclosed.

The mobile terminal 9 transmits a DISCONNECT message (CC-DISCONNECT) to the AGW server 51 using the CC protocol (S20). The DISCONNECT message is a message requesting the release of the wireless access connection. Upon receiving the DISCONNECT message, the AGW server 51 transmits a BYE message to the CSCF server 3 using SIP (S21). The BYE message is a message requesting the termination of the call, and is used to terminate the session.

Upon receiving the BYE message from the AGW server 51, the CSCF server 3 acquires information about the destination of the call to be released and information about the caller. For example, the CSCF server 3 acquires the URI of the destination of the call set in a request line included in the BYE message as the information about the destination of the call, and acquires the information about the caller from the From field included in the header part of the Bye message. In this example, the CSCF server 3 acquires User2 as the information about the destination of the call and User1 as the information about the caller. Since the CSCF server 3 recognizes that a guidance message is connected to the call between User1 and User2, it changes the information about the destination of the call to LGN denoting the guidance message in the BYE message and then transmits the BYE message to the MRF server 2 (S22).

Upon receiving the BYE message from the CSCF server 3, the MRF server 2 stops the transmission of the guidance message to the caller (User1) represented by the information about the caller included in the received BYE message. Subsequently, the MRF server 2 transmits an OK (200) message back to the CSCF server 3 (S25). Upon receiving the OK message, the CSCF server 3 transfers the OK message to the AGW server 51 (S26).

Upon receiving the OK message from the CSCF server 3, the AGW server 51 transmits a RELEASE message (CC-RELEASE) to the mobile terminal 9 using the CC protocol (S27). Upon receiving the RELEASE message, the mobile terminal 9 releases a resource used for the call. Subsequently, the mobile terminal 9 transmits a RELEASE-COMPLETE message (CC-RELEASE-COMPLETE) to the AGW server

51 (S28). As a result of the above-described communication sequence, the established call connection between the mobile terminal 9 and the guidance message is released.

Thus, conventionally in the guidance message unicast connection process, calls originated from mobile terminals are individually provided with communication resources, and a guidance message is transmitted to the mobile terminals using the provided communication resources. Furthermore, a call to be restricted is connected to a guidance message. That is, even if the AGW server is set as a server to be call-restricted due to frequent communication, call restriction processing continues. Accordingly, if the number of calls to be restricted is increased, the traffic of a mobile network is further increased and the processing load on the AGW server, the CSCF server 3, and the MRF server 2 which perform processing for connecting the call and the guidance message is also increased.

A mobile network system according to the first embodiment will be described below. A mobile network system according to the first exemplary embodiment differs from a mobile network system disclosed above including that a guidance message may be multicast transmitted from the MRF server 502. A mobile network system according to a first exemplary embodiment is disclosed.

Figure 5:
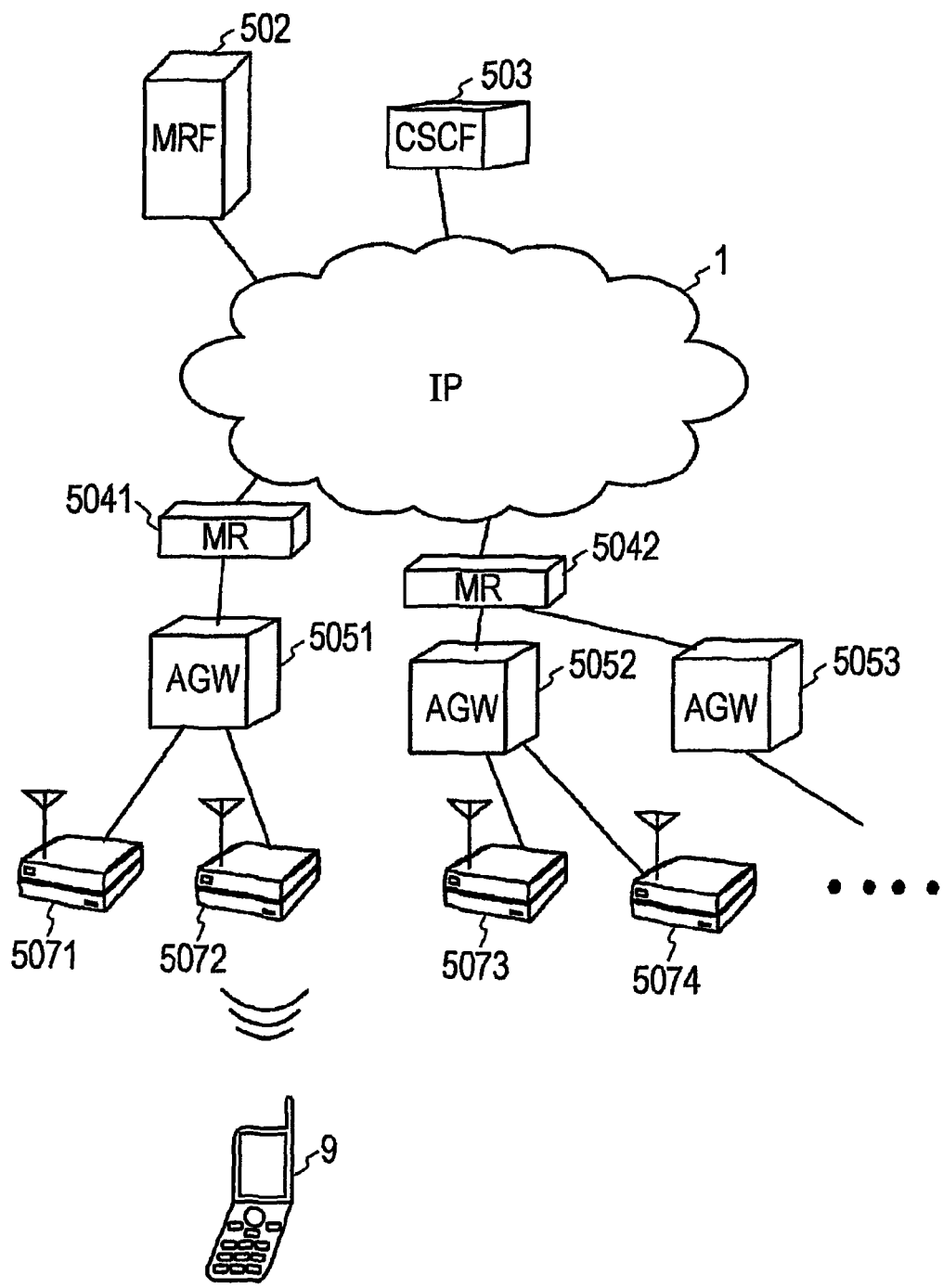
FIG. 5 illustrates an exemplary mobile network system.

FIG. 5 illustrates a mobile network system (hereinafter also referred to as a system) according to the first embodiment. A system according to the first embodiment further includes a Multicast Routers (MR) 5041 and 5042 in addition to the components included in the above-described mobile network system. In a system according to the first embodiment, the MRF server 502, the CSCF server 3, and the MR 5041, 5042 are connected to each other via the IP network 1.

The MR 5041, 5042 is a router applicable to multicast communication. The MR 5041, 5042 has a known function of routing an IP packet and a function of rouging a multicast packet for which a multicast address is set. More specifically, the MR 5041, 5042 functions as a router for connecting the AGW server to the IP network 1, and multicasts a multicast packet received from the IP network 1 to the AGW servers 5051, 5052, and 5053 that are connected thereto and are included in a multicast group of the multicast packet. The MR 5041, 5042 receives from the AGW server an application for participation in a specific multicast group and an application for withdrawal from the specific multicast group using the Internet Group Management Protocol (IGMP), and manages pieces of information about these applications. Referring to FIG. 5, the MR 5041 is connected to the AGW server 5051, and the MR 5042 is connected to the AGW server 5052 and the AGW server 5053. The participation/withdrawal in/from a multicast group in IGMP is specified by RFC1112, RFC2236, RFC3376, etc., and the description thereof will be omitted. This embodiment does not limit the version of IGMP.

Figure 6:
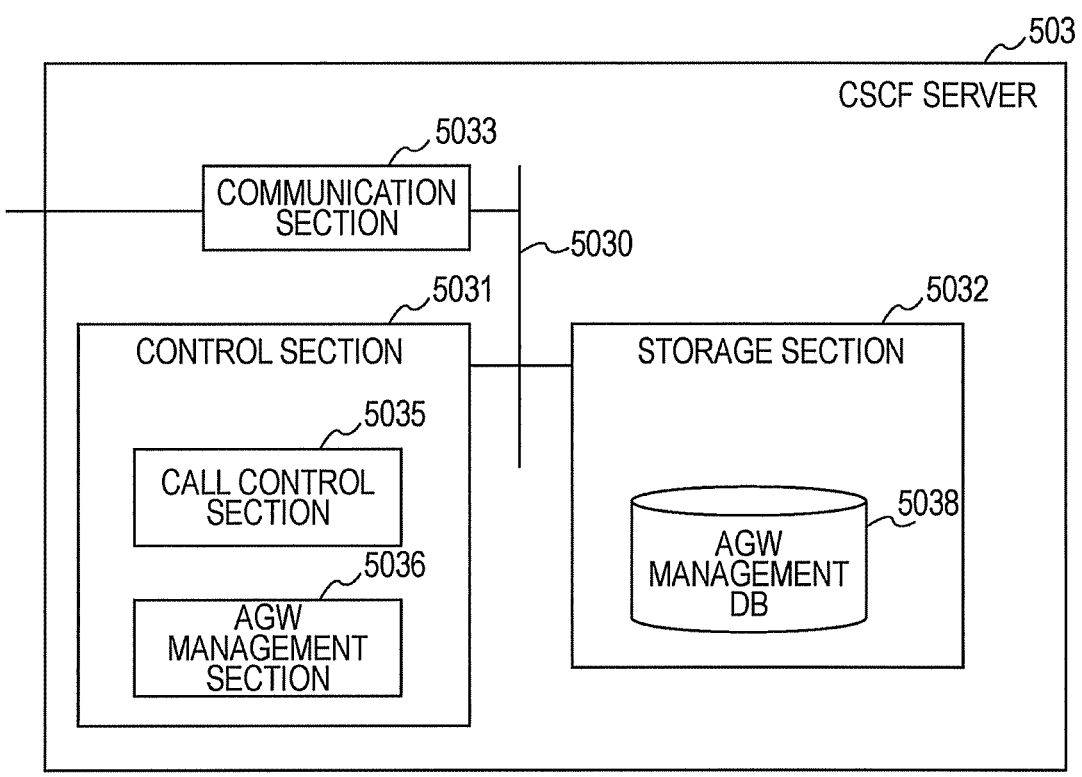
FIG. 6 illustrates an exemplary CSCF server.

FIG. 6 illustrates an exemplary a CSCF server according to a first embodiment. The CSCF server 503 according to the first embodiment includes a control section 5031, a storage section 5032, a communication section 5033, etc. The control section 5031, the storage section 5032, and the communication section 5033 are connected to each other via, for example, a bus 5030. Each of these sections is achieved by software components, hardware components, or the combination of the software components and the hardware components (see, a section "Others").

The storage section 5032 stores an AGW management database (DB) 5038. The AGW management DB 5038 stores address information of each of the AGW servers 51, 52, and 53, information about the mobile terminal 9 connected to each of the AGW servers 51, 52, and 53, and load information of each of the AGW servers 51, 52, and 53. The information about the mobile terminal 9 connected to each of the AGW servers 51, 52, and 53 is acquired using, for example, an SIP REGISTER message, and includes, for example, a telephone number. The load information of each of the AGW servers 51, 52, and 53 may be acquired using a standard message such as an SIP message or a Simple Network Management Protocol (SNMP) message, or may be acquired from the AGW server using a unique communication message. For example, as the load information, the number of established call connections may be used instead of the load information of a processor.

The communication section 5033 includes a communication interface board (not illustrated), and performs SIP communication etc. The control section 5031 includes a call control section 5035 and an AGW management section 5036. The call control section 5035 performs call processing on the basis of an SIP message transmitted via the communication section 5033. The AGW management section 5036 manages the load on the AGW server.

The AGW management section 5036 acquires the load information of the AGW server and stores the acquired load information in the AGW management DB 5038. If the load on the AGW server exceeds a predetermined load, the AGW management section 5036 determines that call restriction should be performed upon the AGW server and stores data indicating that call restriction is being performed in the AGW management DB 5038. The AGW server may determine whether call restriction should be performed and notify the AGW management section 5036 of a result of the determination. On the other hand, if the load on the call-restricted AGW server falls below the predetermined load, the AGW management section 5036 determines to remove the call restriction. The AGW management section 5036 may be notified of the removal of the call restriction by the AGW server.

If the AGW server to be call-restricted is determined, the call control section 5035 transmits an INVITE message to the MRF server 502 so as to cause the MRF server 502 to multicast transmit a guidance message. The call control section 5035 may detect the AGW server to be call-restricted periodically or at the time of receiving the load information of the AGW server. The INVITE message includes an LGN specifying a guidance message, and a multicast address and a port number which are used for transmission of a guidance message.

FIG. 7 illustrates an exemplary format of an INVITE message according to the first embodiment including a request line 71, a header part 72, and empty line 73, and a body part 74. As illustrated in FIG. 7, in the first embodiment, in the body part of the INVITE message, a multicast address may be set for connection information (the c field) and a port number used for multicast transmission may be set for media information. The LGN is the same as that included in an INVITE message in the above-described related art.

The call control section 5035 transmits an SIP OPTIONS message to the AGW server to be call-restricted as a call restriction instruction. In the OPTIONS message, the multicast address, the port number, etc. included in the INVITE message are set.

FIG. 8 illustrates an exemplary format of an OPTIONS message used for a call restriction instruction according to the first embodiment including a request line 81, a header part 82, and empty line 83, and a body part 84. In an OPTIONS message illustrated in FIG. 8, the URI of the AGW server to be call-restricted may be set in the request line and the Via field and To field of the header part, the URI of the CSCF server 503 may be set in the From field of the header part, a call restriction condition may be set in the Overload-Control field of the header part, a multicast address may be set for the connection information (the c field) in the body part, and a port number used for multicast transmission may be set for the media information in the body part. The call restriction condition includes a restriction percentage (call loss probability), the URI (target) of an AGW to be call-restricted, and a character string (call restriction) representing call restriction. As illustrated in FIG. 8, in the OPTIONS message used for a call restriction instruction, the restriction percentage (call loss probability) included in the call restriction condition may be set to 100.

If the call control section 5035 detects the AGW server to be call-derestricted, it transmits an SIP OPTIONS message to the AGW server as a call restriction removal instruction. FIG. 9 illustrates an exemplary format of an OPTIONS message used for a call restriction removal instruction according to the first embodiment including a request line 91, a header part 92, and empty line 93, and a body part 94. As illustrated in FIG. 9, in an OPTIONS message used for a call restriction removal instruction, the restriction percentage (call lost probability) included in the call restriction condition may be set to zero dislike in the OPTIONS message used for the call restriction instruction. In an exemplary OPTIONS message illustrated in FIG. 9, a multicast address and a port number which are used for an incoming guidance message are set for the connection information and the media information included in the body part, respectively. In an exemplary case illustrated in FIG. 9, if the AGW server belongs to a plurality of multicast groups, it determines to leave a multicast group specified by the OPTIONS message. Since the AGW server has already been notified of the multicast address and the port number included in the OPTIONS message used for the call restriction instruction, the OPTIONS message used for the call restriction removal instruction may not include the body part.

If there is no AGW to be call-restricted, the call control section 5035 transmits an SIP BYE message to the MRF server 502 so as to cause the MRF server 502 to terminate the multicast transmission of the guidance message.

Figure 10:
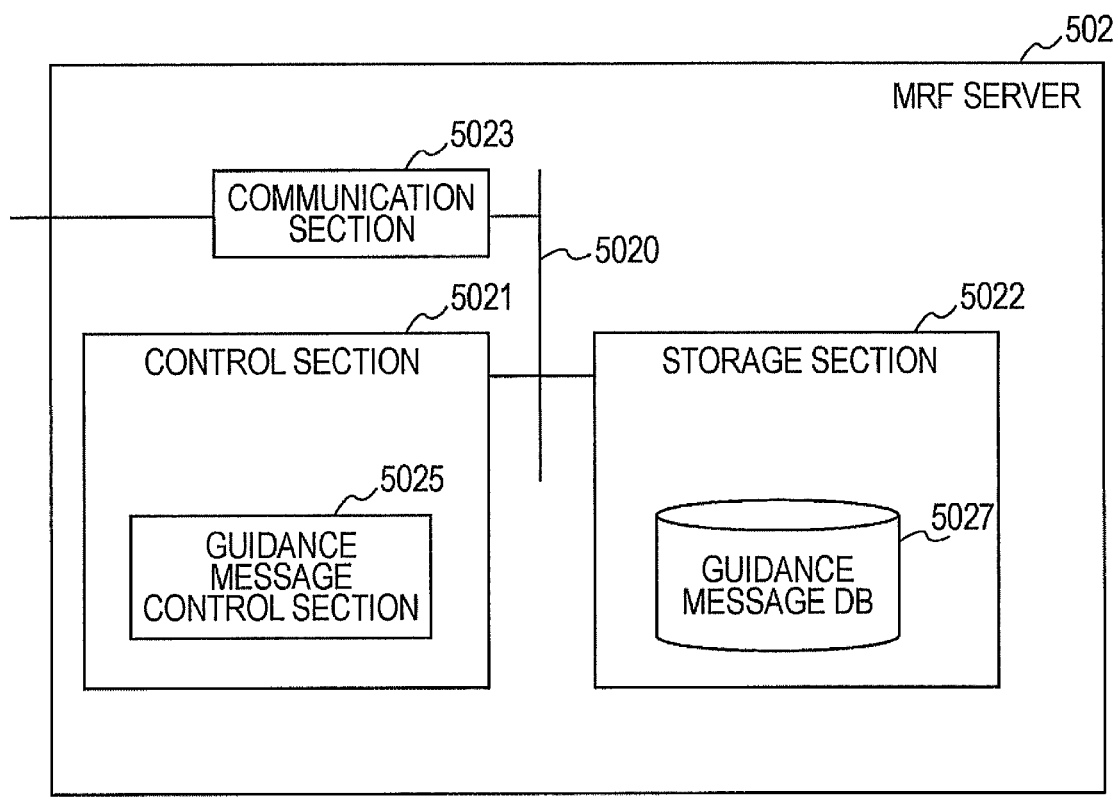
FIG. 10 illustrates an exemplary an MRF server.

FIG. 10 illustrates an exemplary an MRF server according to the first embodiment. The MRF server 502 according to the first embodiment includes a control section 5021, a storage section 5022, a communication section 5023, etc. The control section 5021, the storage section 5022, and the communication section 5023 are connected to each other via, for example, a bus 5020. Each of these sections may be achieved by software components, hardware components, or the combination of the software components and the hardware components (see, the section "Others").

The storage section 5022 stores a guidance message database (DB) 5027. The guidance message DB 5027 stores an LGN and message data digitalized by an audio CODEC or the like for each guidance message. Each guidance message may be fixed data or changeable data. For example, if a guidance message update processing section (not illustrated) receives the change in the state of a call-restricted AGW, it may update corresponding guidance message data in accordance with the change in the sate of the AGW. For example, if the load on the call-restricted AGW is reduced, the guidance message saying that "the line is very busy, please try your call later" may be updated to a guidance message saying that "the situation is improving, but the line is still busy, please try your call later".

The communication section 5023 includes a communication interface board (not illustrated), and performs SIP communication, RTP communication, etc.

The control section 5021 includes a guidance message control section 5025. The guidance message control section 5025 acquires the LGN, the multicast address, and the port number included in the INVITE message transmitted from the CSCF server 503 to the communication section 5023. For example, referring to FIG. 7, the LGN is acquired from the request line, the multicast address is acquired from the connection information (the c field) of the body part, and the port number is acquired from the media information (the m field) of the body part.

The guidance message control section 5025 extracts message data corresponding to the acquired LGN from the guidance message DB 5027, and multicast transmits the extracted message data using RTP. At that time, the acquired multicast address and the acquired port number are set in an RTP packet. For example, the multicast transmission of a guidance message is periodically performed.

On the other hand, if the communication section 5023 receives a BYE message from the CSCF server 503, the guidance message control section 5025 terminates the multicast transmission of a corresponding guidance message.

Figure 11:
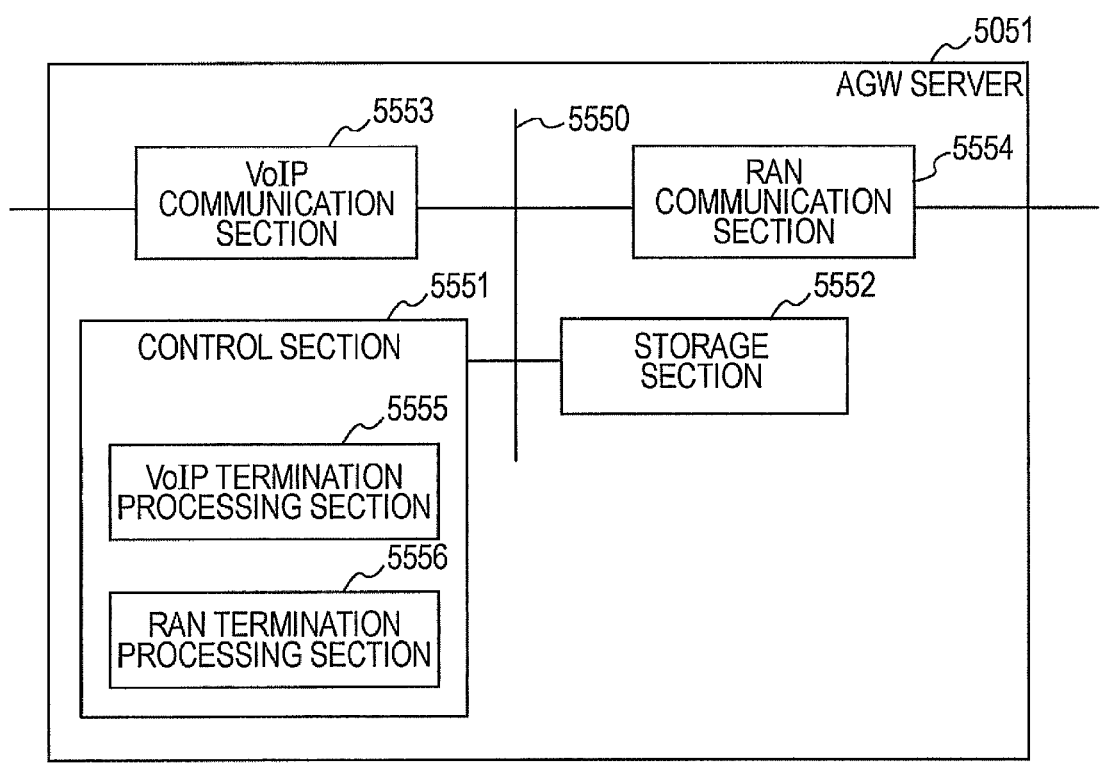
FIG. 11 illustrates an exemplary an AGW.

FIG. 11 illustrates an exemplary an AGW according to the first embodiment. The AGW server 5051 according to the first embodiment includes a control section 5551, a storage section 5552, a VoIP communication section 5553, a RAN communication section 5554, etc. The control section 5551, the storage section 5552, the VoIP communication section 5553, and the RAN communication section 5554 are connected to each other via, for example, a bus 5550. Each of these sections is achieved by software components, hardware components, or the combination of the software components and the hardware components (see, the section "Others").

The AGW server according to the first embodiment may be connected to the IP network 1 via the MR 5041, 5042. Accordingly, the VoIP communication section 5553 includes a communication interface board (not illustrated) for accommodating a communication line connected to the MR 5041, 5042, and performs VoIP communication via the MR 5041, 5042 using SIP, RTP, etc. Furthermore, the VoIP communication section 5553 transmits/receives an IGMP message to/from the MR 5041, 5042. The RAN communication section 5554 includes a communication interface board (not illustrated) for accommodating a communication line connected to the base station 71, 72, 73, 74, etc. subordinated thereto, and performs RAN communication with the mobile terminal 9 via the base station 71, 72, 73, 74, etc. using the CC protocol etc.

The control section 5551 includes a VoIP termination processing section 5555 and a RAN termination processing section 5556. The VoIP termination processing section 5555 terminates VoIP communication performed by the VoIP communication section 5553. As a part of the termination processing, upon receiving an OPTIONS message used for call restriction from the CSCF server 503, the VoIP termination processing section 5555 transmits an OK message back to the CSCF server 503. Furthermore, the VoIP termination processing section 5555 acquires a multicast address and a port number from the OPTIONS message and transmits an application for participation in the acquired multicast address to the MR 5041, 5042 using IGMP. Upon receiving the OPTIONS message, the VoIP termination processing section 5555 recognizes that it is call-restricted and notifies the RAN termination processing section 5556 of the fact. Subsequently, the VoIP communication section 5553 receives a guidance message that is multicast transmitted from the MRF server 502. Upon receiving the guidance message data, the VoIP termination processing section 5555 transmits the received guidance message data to the RAN termination processing section 5556.

On the other hand, upon receiving an OPTIONS message used for a call restriction removal instruction, the VoIP termination processing section 5555 transmits an OK message back to the CSCF server 503. Furthermore, the VoIP termination processing section 5555 acquires a multicast address and a port number from the received OPTIONS message, and transmits an application for withdrawal from the multicast address to the MR 5041, 5042 using IGMP. Upon receiving an OPTIONS message, the VoIP termination processing section 5555 determines whether the OPTIONS message is a call restriction instruction or a call restriction removal instruction by referring to a restriction percentage (call loss probability) included in the Overload-Control field of the header part of the OPTIONS message. The VoIP termination processing section 5555 recognizes that it is call-derestricted, and notifies the RAN termination processing section 5556 of the fact.

The RAN termination processing section 5556 terminates RAN communication that is performed by the RAN communication section 5554 using the CC protocol etc. Upon receiving from the mobile terminal 9 a SETUP message after receiving from the VoIP termination processing section 5555 the notification that call restriction has been performed, the RAN termination processing section 5556 transmits a CALL-PROCEEDING message to the mobile terminal 9 without relaying it to SIP. If the RAN termination processing section 5556 receives pieces of guidance message data after transmitting the CALL-PROCEEDING message to the mobile terminal 9, it sequentially transmits the pieces of guidance message data to the mobile terminal 9 connected thereto. At that time, if the RAN termination processing section 5556 is wirelessly connected to a plurality of mobile terminals 9, the RAN termination processing section 5556 makes a number of copies of the guidance message data which is the same as the number of the mobile terminals 9 connected thereto and individually transmits these copies of the guidance message to the mobile terminals 9.

Figure 12:
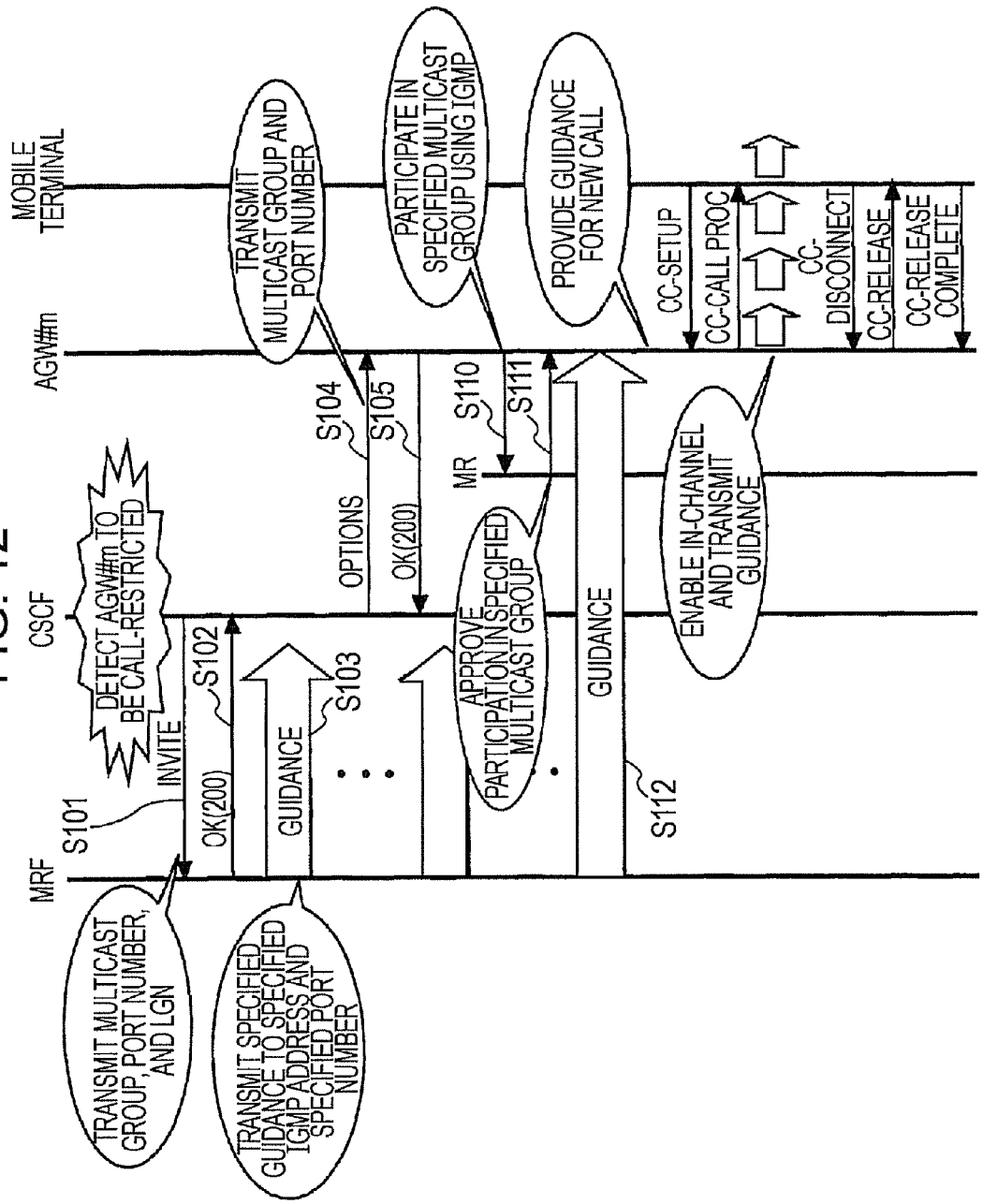
FIG. 12 illustrates a guidance message connection process.

An exemplary operation of a mobile network system according to the first embodiment will be described below. FIG. 12 illustrates a guidance message connection process according to a first embodiment.

Figure 13:
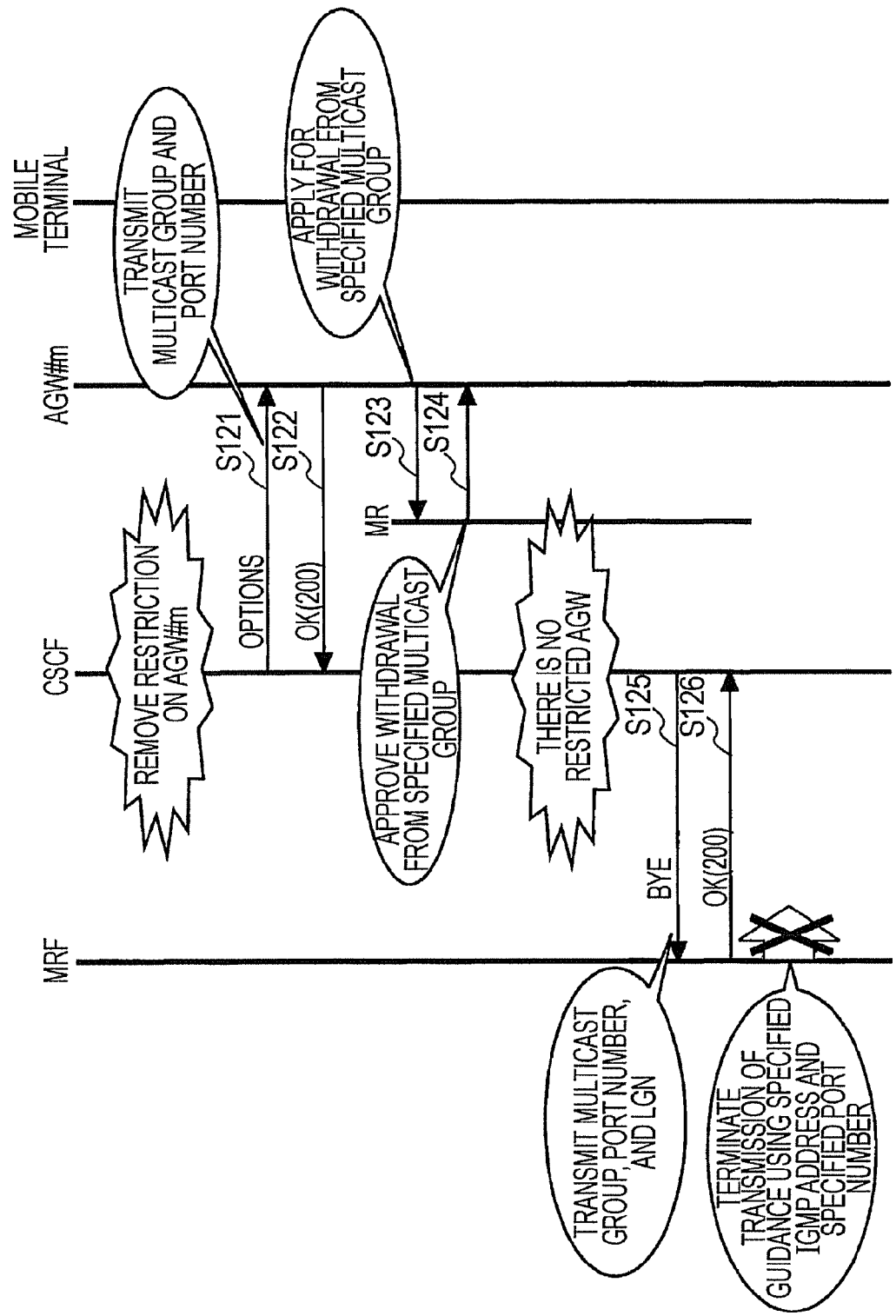
FIG. 13 illustrates a guidance message termination process.

If the CSCF server 503 detects an AGW server on which a load exceeding a predetermined load is applied, it determines that the detected AGW server should be call-restricted. In this example, the AGW server 5 (#m) is set as a subject of call restriction, where "AGW Server 5 (#m) indicates one of AGW Server 5051, 5052, 5053 and is also abbreviated as "AGW #m" as depicted in FIGS. 12 and 13. After setting the AGW server 5 (#m) as a subject of call restriction, the CSCF server 503 determines an LGN denoting a corresponding guidance message, a multicast address, and a port number. The CSCF server 503 generates an INVITE message including the LGN, the multicast address, and the port number (see, FIG. 7) and transmits the INVITE message to the MRF server 502 (S101).

Upon receiving the INVITE message, the MRF server 502 extracts the LGN, the multicast address, and the port number from the INVITE message and stores them. The MRF server 502 transmits an OK (200) message back to the CSCF server 503 (S102). Subsequently, the MRF server 502 extracts guidance message data corresponding to the extracted LGN from the guidance message DB 5027. The MRF server 502 multicast transmits the guidance message data using the extracted multicast address and extracted the port number (S103). After that, the MRF server 502 periodically multicast transmits the guidance message. Alternatively, the MRF server 502 may multicast transmit the guidance message each time the guidance message is updated. However, at that time, any of the AGW servers 5051, 5052, and 5053 cannot receive the guidance message multicast transmitted from the MRF server 502.

Thus, in an exemplary first embodiment, since the MRF server 502 does not perform a guidance message providing process for each restricted call, it transmits guidance message data after receiving an INVITE message and transmitting an OK message. Accordingly, the number of transmitted/received messages can be reduced in an exemplary first embodiment as compared with the above-described related art in which the TRYING (100) message and the ACK message are transmitted/received in addition to the above-described messages. In an exemplary first embodiment, like in the related art, after an INVITE message, a TRYING message, an OK message, and an ACK message have been exchanged between the CSCF server 503 and the MRF server 502, guidance message data may be transmitted from the MRF server 502.

The above-described process may be performed when a first AGW to be call-restricted is detected. If another one of the AGW servers 5051, 5052, and 5053 is set as a subject of call restriction, the processing (S101) and the processing (S102) are not performed. The reason for this is that a desired guidance message has already been multicast transmitted from the MRF server 502 at the time of call restriction of the AGW server 5 (#m) (S103).

Upon receiving the OK message, the CSCF server 503 transmits an SIP OPTIONS message (see, FIG. 8) to the AGW server 5 (#m) to be call-restricted (S104). The OPTIONS message used for a call restriction instruction includes the above-described multicast address, the above-described port number, etc.

[Upon receiving the OPTIONS message, the AGW server 5 (#m) to be call-restricted determines whether the OPTIONS message is a call restriction instruction or a call restriction removal instruction by referring to a restriction percentage (call loss probability) included in the Overload-Control field of the header part of the OPTIONS message. In this example, since the restriction percentage of 100 is set, the AGW server 5 (#m) determines that the OPTIONS message is a call restriction instruction. The AGW server 5 (#m) extracts the multicast address and the port number from the OPTIONS message, and transmits an OK message back to the CSCF server 503 (S105). The AGW server 5 (#m) transmits an application for participation in a multicast group specified by the multicast address to the MR 5041, 5042 connected thereto using IGMP (S110). In the participation application, the port number extracted from the OPTIONS message is set as a transmission source port number. Upon receiving participation approval that has been transmitted from the MR 5041, 5042 in response to the participation application (S111), an AGW server prepares for reception of data that is transmitted using the multicast address and the port number.

Upon receiving the participation application from the AGW server 5 (#m) using IGMP, the MR 5041, 5042 stores the multicast address, the port number, and the IP address of the AGW server 5 (#m) registered as a transmission destination which are included in the participation application. After that, the MR 5041, 5042 transmits a multicast packet that has been transmitted thereto using the stored multicast address and the stored port number to an AGW that is registered as the transmission destination. At that time, if a plurality of AGWs is registered, the multicast packet is multicast transmitted to these AGWs. In this example, the guidance message data is multicast transmitted from the MRF server 502 to the MR 5041, 5042 and is then transferred from the MR 4 to the AGW server 5 (#m) (S112).

That is, if the AGW server 5 (#m) transmits an application for participation in a target multicast group to the MR 4, it can receive a guidance message that is multicast transmitted from the MRF server 502. After that, if the CSCF server 503 sets another AGW (the AGW server 5 (#n)) as a subject of call restriction, the above-described pieces of communication processing (S104 and S105) are performed between the CSCF server 503 and the AGW server 5 (#n).

Upon receiving a SETUP message (CC-SETUP) from the mobile terminal 9 using the CC protocol while being call-restricted and receiving a guidance message, the AGW server 5 (#m) establishes wireless access connection with the mobile terminal 9 by transmitting a CALL-PROCEEDING message (CC-CALL-PROC) to the mobile terminal 9. Subsequently, upon receiving the guidance message, the AGW server 5 (#m) transmits the guidance message to the mobile terminal 9 that is wirelessly connected thereto. Like in the sequence in the related art illustrated in FIG. 2, after the CONNECT message (CC-CONNECT) and the CONNECT-ACK message (CC-CONNECT ACKNOWLEDGE) have been exchanged between the AGW server 5 (#m) and the mobile terminal 9 using the CC protocol, a guidance message may be transmitted from the AGW server 5 (#m) to the mobile terminal 9. Alternatively, after the PROGRESS message (CC-PROGRESS) and the PROGRESS-ACK (CC-PROGRESS ACKNOWLEDGE) have been exchanged between the AGW server 5 (#m) and the mobile terminal 9 using the CC protocol, a guidance message may be transmitted from the AGW server 5 (#m) to the mobile terminal 9.

On the other hand, if the mobile terminal 9 that has received the guidance message disconnects the call, an SIP message is not transmitted/received to/from the IP network 1 and the CC protocol sequence (the DISCONNECT message (CC-DISCONNECT), the RELEASE message (CC-RELEASE), and the RELEASE-COMPLETE message (CC-RELEASE-COMPLETE)) may be performed between the AGW server 5 (#m) and the mobile terminal 9.

FIG. 13 illustrates a guidance message termination process according to an exemplary first embodiment.

If the CSCF server 503 detects the reduction in the load on the call-restricted AGW server 5 (#m), it determines to remove the call restriction on the AGW server 5 (#m). The CSCF server 503 may determine the removal of the call restriction on the basis of corrected pieces of information about the load on the AGW server or a notification transmitted from the AGW server. If the CSCF server 503 determines to remove the call restriction on the AGW server 5 (#m), it transmits an OPTIONS message (see, FIG. 9) including an LGN denoting a guidance message that has already been multicast transmitted, a multicast address, and a port number to the AGW server 5 (#m) (S121). Since the OPTIONS message is a call restriction removal instruction, a restriction percentage of zero (call loss probability) may be set in the Overload-Control field of the header part of the OPTIONS message.

Upon receiving the OPTIONS message, the AGW server 5 (#m) determines that the OPTIONS message is a call restriction removal instruction by referring to the restriction percentage (call loss probability) of zero in the Overload-Control field of the header part of the OPTIONS message. The AGW server 5 (#m) extracts the multicast address and the port number from the OPTIONS message and transmits an OK message back to the CSCF server 503 (S122). Since the AGW server 5 (#m) participates in a multicast group specified by the multicast address, it transmits an application for withdrawal from the multicast group to the MR 4 using IGMP (S123). In the withdrawal application, the port number extracted from the OPTIONS message may be set as a transmission source port number. The AGW server 5 (#m) receives approval for the withdrawal application from the MR 4 (S124).

Upon receiving the withdrawal application from the AGW server 5 (#m) using IGMP, the MR 4 excludes the AGW server 5 (#m) that is a transmission source of the withdrawal application from the multicast group on the basis of the multicast address and the port number which are included in the withdrawal application. After that, even if the MR 4 receives a multicast packet that has been transmitted using the stored multicast address and the stored port number, it does not transmit the multicast packet to the AGW server 5 (#m). For example, at the time of withdrawal from a multicast group, the withdrawal application is transmitted from the AGW server 5 (#m) to the MR 4 (S123) and the withdrawal approval is transmitted from the MR 4 to the AGW server 5 (#m) (S124). However, the MR 4 may recognize the withdrawal state of the AGW server 5 (#m) using another method. A method of withdrawing from a multicast group that is performed by the AGW server 5 (#m) is not limited to the above-described method.

If the CSCF server 503 determines to remove the call restriction on the AGW server 5 (#m), it checks the presence of another call-restricted AGW server. If the CSCF server 503 determines that there is no call-restricted AGW server, it transmits an SIP BYE message to the MRF server 502 so as to terminate the transmission of a guidance message used for a call restriction instruction (S125). An LGN specifying the guidance message may be set in the BYE message. Upon receiving the BYE message, the MRF server 502 terminates the multicast transmission of the guidance message specified by the LGN included in the BYE message.

In a mobile network system according to an exemplary first embodiment, a guidance message is multicast transmitted from the MRF server 502 using a multicast address specified by the CSCF server 503. The call-restricted AGW server transmits an application for participation in the multicast address to the MR 4 on the basis of the multicast address etc. included in an OPTIONS message transmitted from the CSCF server 503 thereto, thereby receiving a guidance message that is multicast transmitted from the MRF server 502.

If the mobile terminal 9 that is wirelessly connected to the base station 5071, 5072, 5073, 5074, etc. subordinated to the call-restricted AGW server originates a call, the wireless access connection between the AGW server and the mobile terminal 9 is established and then a guidance message received by the AGW server is transmitted to the mobile terminal 9.

Thus, according to an exemplary first embodiment, even if the number of calls to be restricted is increased, each of the calls to be restricted is processed between the mobile terminal 9 and the AGW server. Accordingly, the increase in the processing load on the CSCF server 503 and the MRF server 502 and the increase in the traffic of the IP network 1 which are caused by the increase in the number of calls to be restricted can be prevented. That is, the increase in the load on a mobile network that is caused by the increase in the number of calls to be restricted can be prevented.

Furthermore, in an exemplary first embodiment, if the control section 5551 included in the AGW server receives multicast-transmitted guidance messages using RTP, the guidance messages are sequentially transferred to the RAN termination processing section 5556 and are then individually transmitted to the mobile terminals that are wirelessly connected to the AGW server. That is, since the mobile terminal receives a guidance message when the wireless access connection between the mobile terminal and the AGW server is established, it sometimes receives a part of the guidance message. Accordingly, since a message is transmitted to each of the mobile terminals in real time in an exemplary first embodiment, the exemplary first embodiment is applicable to a system in which a guidance message is changeable.

A hardware component is a hardware circuit, and may be, for example, a Field Programmable Gate Array (FPGA), an Application Specific Integrated Circuit (ASIC), a gate array, a combination of logic gates, a signal processing circuit, or an analog circuit.

Software components are (segments of) components for realizing the above-described processing as software, and are not any concept that limits a language, a development environment, etc., which realize the software. The software components are, for example, a task, a process, a thread, a driver, firmware, a database, a table, a function, a procedure, a subroutine, a predetermined part of a program code, a data structure, an array, a variable, a parameter, etc. These software components may be realized on a single or a plurality of memories (a single or a plurality of processors (e.g., Central Processing Units (CPUs) or Digital Signal Processors (DSPs)).

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM. ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A mobile network system comprising:
a guidance message control server;
a call control server; and
a plurality of access gateways each of which is connected to a mobile terminal via a wireless base station,
wherein the call control server includes:
a gateway management section that determines at least one of the plurality of access gateways as a subject of call restriction,
a first instructing section that transmits a message transmission instruction including message specifying information and group specifying information to the guidance message control server in a case where the gateway management section determines an access gateway to be call-restricted, and
a second instructing section that transmits a call restriction instruction including the group specifying information to the access gateway determined to be call-restricted by the gateway management section,
wherein the guidance message control server includes:
a receiving section that receives the message transmission instruction from the call control server,
an acquisition section that acquires guidance message data specified by the message specifying information included in the message transmission instruction received by the receiving section, and
a transmission section that transmits using a multicast transmission the guidance message data acquired by the acquisition section to a multicast group specified by the group specifying information included in the message transmission instruction received by the receiving section, and
wherein each of the plurality of access gateways includes:
a processing section that, in a case where the processing section receives the call restriction instruction from the call control server, performs multicast group participation processing to participate in the multicast group specified by the group specifying information included in the call restriction instruction, and
a guidance transmission section that transmits the guidance message data that is received as a result of the multicast group participation processing performed by the processing section to the mobile terminal requesting the guidance transmission section to perform call connection via the wireless base station.

2. The mobile network system according to claim 1, wherein, in a case where the gateway management section determines a second access gateway to be call-restricted after determining a first access gateway to be call-restricted, the second instructing section transmits to the second access gateway determined to be call-restricted a call restriction instruction including the same group specifying information as that included in a call restriction instruction transmitted to the first access gateway to be call-restricted.

3. The mobile network system according to claim 1, wherein each of the plurality of access gateways further includes a connection requesting section that, in a case where the mobile terminal requests the access gateway to perform connection of a call via the wireless base station, requests the call control server to perform call connection between the access gateway and another one of the plurality of access gateways connected to a mobile terminal that is designated as a call partner in the call,
wherein, in a case where each of the plurality of access gateways receives the call restriction instruction from the call control server, the processing section and the guidance transmission section operate, and
wherein, in a case where each of the plurality of access gateways is not call-restricted, the connection requesting section operates.

4. The mobile network system according to claim 1,
wherein the gateway management section determines to remove a restriction on at least one of the plurality of access gateways that is set as the subject of call restriction,
wherein the second instructing section transmits to the access gateway that is determined to be call-derestricted by the gateway management section a call restriction removal instruction including the same group specifying information as that included in the call restriction instruction that has already been transmitted to the access gateway, and wherein the processing section performs processing to withdraw from a multicast group specified by the group specifying information included in the call restriction removal instruction received from the call control server.

5. The mobile network system according to claim 4, wherein, in a case where all of the plurality of access gateways are determined to be call-derestricted by the gateway management section, the first instructing section transmits a message termination instruction to the guidance message control server.

6. A guidance message providing method performed in a mobile network system including a guidance message control server, a call control server, and a plurality of access gateways each of which is connected to a mobile terminal via a wireless base station, the guidance message providing method comprising:

performing an operation using the call control server including:

determining at least one of the plurality of access gateways as a subject of call restriction, transmitting a message transmission instruction including message specifying information and group specifying information to the guidance message control server in a case where an access gateway to be call-restricted is determined, and transmitting a call restriction instruction including the group specifying information to the access gateway determined to be call-restricted;

performing an operation using the guidance message control server including:

receiving the message transmission instruction from the call control server, acquiring guidance message data specified by the message specifying information included in the received message transmission instruction, and multicast transmitting the acquired guidance message data to a multicast group specified by the group specifying information included in the received message transmission instruction; and performing an operation using at least one of the plurality of access gateways including:

in a case where the call restriction instruction is received from the call control server, performing multicast group participation processing to participate in a multicast group specified by the group specifying information included in the call restriction instruction, and transmitting the guidance message data that is received as a result of the multicast group participation processing to the mobile terminal requesting connection of a call via the wireless base station.

7. The guidance message providing method according to claim 6, comprising:

in a case where a second access gateway to be call-restricted is determined after a first access gateway to be call-restricted has been restricted, transmitting to the second access gateway determined to be call-restricted, from the call control server, a call restriction instruction including the same group specifying information as that included in a call restriction instruction transmitted to the first access gateway to be call-restricted.

8. The guidance message providing method according to claim 6, comprising:

determining removal of a restriction on at least one of the plurality of access gateways that is set as the subject of call restriction;

transmitting to the access gateway to be call-derestricted a call restriction removal instruction including the same group specifying information as that included in the call restriction instruction that has already been transmitted to the access gateway; and causing at least one of the plurality of access gateways to perform processing for withdrawing from a multicast group specified by the group specifying information included in the call restriction removal instruction received from the call control server, wherein the determining, the transmitting and the causing are performed by the call control server.

9. The guidance message providing method according to claim 8, comprising:

in a case where all of the plurality of access gateways are determined to be call-derestricted, causing the call control server to transmit a message termination instruction to the guidance message control server.

* * * * *

UNITED STATES PATENT AND TRADEMARK OFFICE
CERTIFICATE OF CORRECTION

| | |
|---|---|
| PATENT NO. | : 8,606,243 B2 |
| APPLICATION NO. | : 12/638130 |
| DATED | : December 10, 2013 |
| INVENTOR(S) | : Ohtsu et al. |

It is certified that error appears in the above-identified patent and that said Letters Patent is hereby corrected as shown below:

On Title Page 2, References Cited, In Column 2 (Other Publications), Line 3, Delete "EESR−May 6, 2010." and insert -- EESR−100506 of May 6, 2010. --, therefor.

Signed and Sealed this
Twenty-fifth Day of March, 2014

Michelle K. Lee
*Deputy Director of the United States Patent and Trademark Office*